Patented Jan. 3, 1939

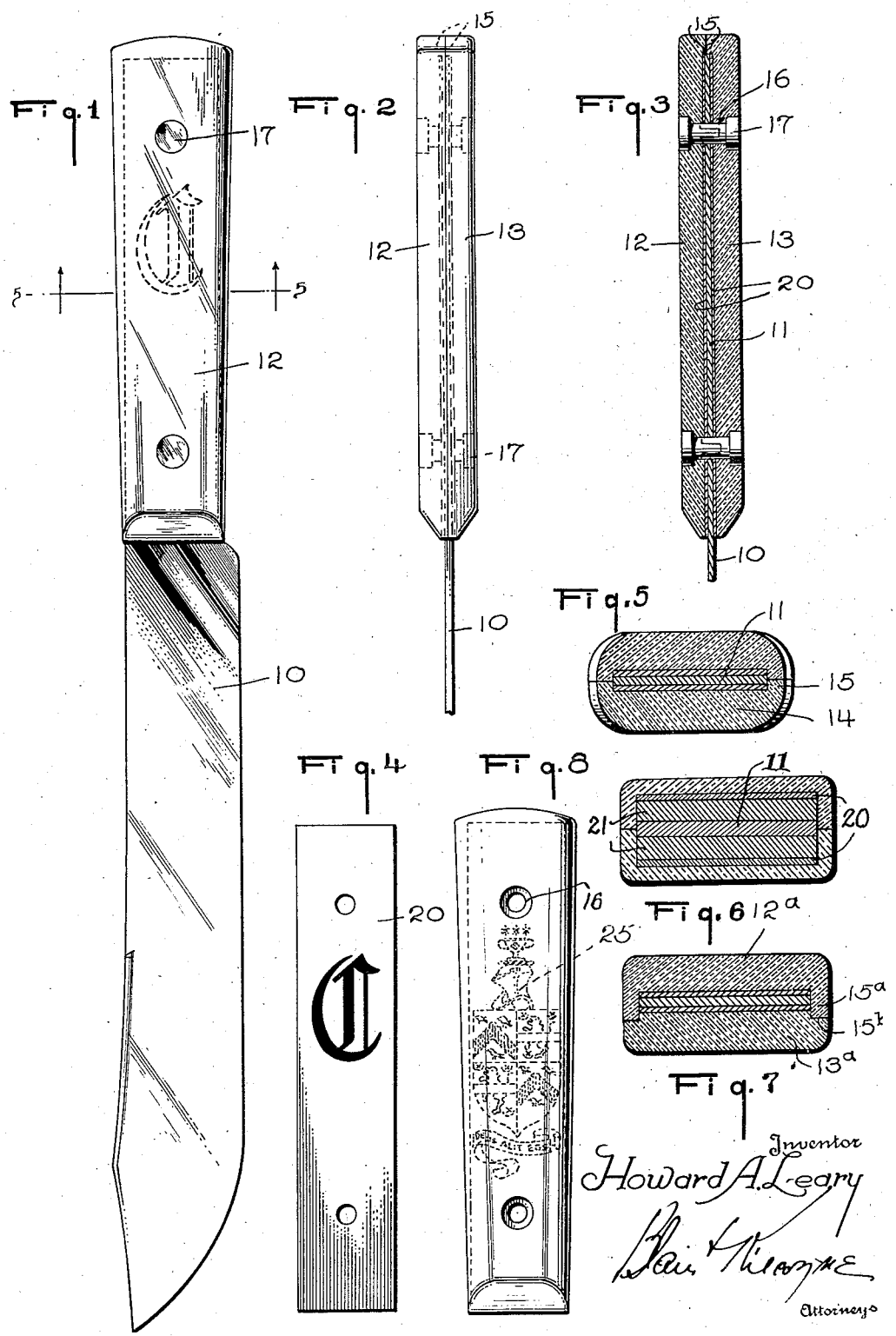

2,142,137

UNITED STATES PATENT OFFICE 2,142,137

HANDLE CONSTRUCTION

Howard A. Leary, Providence, R. I.

Application May 29, 1936, Serial No. 82,630

5 Claims. (Cl. 30—340)

This invention relates to handle constructions and more particularly to handles for implements of cutlery, for domestic utensils, hand tools, and the like.

Among the objects of the present invention may be noted the provision of handles as aforesaid of improved construction and design; the provision of handles which may be inexpensively manufactured on a quantity basis and which may be permanently applied to tangs of implements, utensils, hand tools, and the like, with relatively few operations; the provision of handles of the stated character having a high degree of attractiveness and which are at the same time rugged and durable in use; and the provision of handles as aforesaid with which may be incorporated features of ornamentation, instruction, information, and the like, which features are readily viewable by the user.

Other objects will be in part obvious and in part hereinafter pointed out in connection with the accompanying drawing illustrating an embodiment of my invention.

In the drawing—

Fig. 1 represents an article of manufacture having applied thereto a handle in accordance with the present invention;

Fig. 2 is a partial edge view of the article and handle illustrated in Fig. 1;

Fig. 3 is a longitudinal section through the aforesaid handle and article tang;

Fig. 4 is a face view of an ornamental strip embodied in the handle construction of Fig. 1;

Fig. 5 is a transverse section along lines 5—5 of Fig. 1;

Fig. 6 is a transverse section through a modified handle construction employing fillers between the ornamental strips and the handle tang;

Fig. 7 is a transverse section through another form of handle; and

Fig. 8 is a view of a handle having modified ornamentation features.

Referring now to the drawing wherein like reference characters designate like parts throughout the several views, and particularly to the construction illustrated in Figs. 1–5, I have there illustrated, for the purpose of description, a handle in accordance with my invention as applied to an article of cutlery such as a carving or butcher knife. It will be understood, however, that such an article is typical only of the many articles to which the present handle may be applied. Such a knife article is constituted by a blade portion 10 and a tang portion 11, with the handle of the present invention being associated therewith in the manner now to be described.

The handle is formed by the complemental sections 12 and 13 which, in the embodiment under description, are formed identical, each consisting of a body portion 14 of desired shape and cross-sectional contour, from which projects a relatively upstanding edge rib or flange 15, preferably extending along both sides and across one end of the sections, the other end thereof being devoid of such an edge rib. Tang 11 of the article (knife) is of the substantially full length type, and its length is predetermined so that the tang extends substantially the length of the handle sections, terminating short of the rib portion 15 which extends across the end of the handle section, as seen in Fig. 3.

Thus, with the handle sections properly related to the tang 11, one section on one side of the tang and the other section on the other side of the tang, the tang extends into a tang recess provided between the sections, the dimensions of such recess being substantially those of the tang.

The handle sections and the knife tang are each provided with aligned openings 16, through which may extend securing means such as two-part rivets 17 which act to secure the handle sections to the tang, securement being effected under pressure so that the meeting ribs 15 of the handle sections tightly bear against one another and thus seal the tang recess along the sides and closed end thereof. In order to insure a waterproof joint between the contacting ribs of the handle sections, I may apply thereto a waterproof cement which, in addition to sealing, may further act to adhesively secure the handle sections together.

By the aforesaid arrangement, with the ribs of the handle sections engaging, the tang including its side and end edges is completely enclosed within the complemental handle structure.

While the invention is not limited thereto, I propose to mold the handle sections 12, 13 from a transparent plastic material, one suggested material being now available commercially and sold under the trade name Catalin. I utilize this characteristic of transparency, in connection with other features of my construction, in obtaining certain desirable effects, such as ornamentation, advertising, color effects, and/or enabling the handle to convey information, instructions, or the like to the user of the implement. Such may be accomplished by associating between one or both of the handle sections 12, 13 and the article tang 11 a panel 20 fabricated from a strip of paper or other suitable material. Such a strip or strips may be suitably colored and/or may carry other suitable ornamentation, and/or may be printed or otherwise provided with instructional data in the nature of recipes, tables of cooking and baking temperatures, advertising matter, and the like. In the Figs. 1–5 construction, such strips carry, for purposes of example, an initial which may be the owner's initial, the strips being disposed between the flat faces of the tang 11 and the handle sections and being suitably there held by the rivets 17 which secure the handle sections to the tang. By reason of the transparency of the material from which the handle sections are fabricated, the matter contained on the strips is of course viewable therethrough, and, with the strips extending the full length of the tang and obscuring the same from view, there results not only an ornamental and attractive construction, but one which may carry in readily viewable manner useful information, advertising, and the like.

In order to provide a substantial area on the strips for the ornamental and/or informative matter thereon, the securing rivets 17 extend through the relatively end portions of the handle sections, thus leaving a substantial area between rivets for the matter or data appearing on the strips.

It will be understood that the sealed joint between the engaging edge ribs of the sections prevents water passing to the interior of the handle, whereby long life of the strip and of the matter appearing thereon is assured. It will be further obvious that the strips or panels 20 may be suitably waterproofed or may be made from waterproof material. Again, the end of the handle adjacent the blade 10 or equivalent may be suitably sealed, as by cement, or through the provision of a conventional bolster, with sealing means disposed between the bolster and the adjacent handle ends. Under certain conditions and for certain types of handles, I may provide as illustrated in Fig. 6 a cushioning layer or filler 21 between each of the strips 20 and the related tang faces, such acting to cushion the handle parts during the operation of riveting the handle sections to the tang, and also functioning to conserve the material of the handle strips as well as to pack the strips against the inner face of the handle sections and thus add to the compactness of the finished handle construction. The ornamenting strips 20 mask the fillers 21 with the ornamental matter on the strips being viewable through the handle sections.

Referring now to the Fig. 7 construction, wherein a modified arrangement of handle sections is illustrated, such sections are in the nature of male and female elements, 12a, 13a, as distinguished from the identical handle sections illustrated in Figs. 1–6. Accordingly one section is provided with an edge tongue or rib 15a of substantial depth which fits into an edge groove 15b formed in the companion section, the arrangement of the handle sections and their connection with the tang of the article being otherwise similar to that illustrated in Figs. 1–6.

In Fig. 8 I have illustrated another form of ornamenting the handle construction, in which one or both handle sections are constituted by transparent material, with ornamental or other matter being etched or engraved on the inside surface of the handle section in such manner as to be readily viewable through the material thereof. As in the illustrated figure, such ornamentation may comprise the representation of a crest, as at 25, and has the appearance of cut-glass. With such ornamentation may be combined, for example, a plain colored strip or panel arranged between the tang and the handle section so ornamented, and the result is highly ornamental and pleasing.

By the above described arrangements, I have provided a handle construction for use with implements and utensils generally, which is exceedingly inexpensive in construction, rugged and durable in use, and at the same time is such as to have highly ornamental appearance and/or capable of imparting instructions, information, advertising, and the like.

As many changes could be made in carrying out the above constructions, without departing from the scope of the invention, it is intended that all matter contained in the above description or shown in the accompanying drawing shall be interpreted as illustrative and not in a limiting sense.

I claim:

1. In a handle construction, the combination of a tang, handle sections each disposed on a face of the tang and engaging along side and end edges corresponding to the edges of said tang whereby to completely enclose the tang, said sections being constituted of transparent plastic material, strips disposed between the sides of the tang and the related sections, said strips carrying ornamental or instructional matter, and means securing said sections and strips to said tang.

2. In a handle construction, the combination of a tang, handle sections each disposed on a face of the tang and engaging along side and end edges corresponding to the edges of said tang whereby to completely enclose the tang, at least one of said sections being constituted of transparent plastic material, the transparent section carrying ornamentation on its surface adjacent said tang, viewable through said section, and means securing said sections to said tang.

3. A two-part handle for an article having a tang, consisting of two substantially like sections, each of said sections being constituted of transparent plastic material throughout, and having a body portion and projecting therefrom a rib which extends along the sides and across one end of the sections, the arrangement being such that when the two sections are disposed in facing relation, the ribs of the sections engage and the sections provide a tang receiving recess of dimensions as to completely enclose the tang, the sections also having provisions for the reception of securing means for securing the sections to the tang received in said recess.

4. In a handle construction, the combination of a tang, handle sections each disposed on a face of the tang and being constructed and arranged to completely enclose the tang, the handle sections being constituted of transparent plastic material, a filler strip disposed between each side of the tang and the related section, an ornamenting strip arranged between the filler strip and the adjacent handle section, said ornamenting strip masking the filler strip and carrying matter viewable through the transparent handle section, and means for securing the handle sections in enclosing relation to the tang.

5. In a handle construction, the combination of a tang, handle sections each related to a face of the tang and being constituted of transparent plastic material, filler strips each disposed on a face of the tang, ornamenting strips each arranged intermediate a filler strip and the related handle section, said ornamenting strips masking the filler strips and carrying matter viewable through the handle sections, said handle sections being constructed and arranged to meet along at least the side edges of the tang whereby to enclose the side edges of both the tang and the filler strips, and means for securing the handle sections to the tang.

HOWARD A. LEARY.